US012551892B2

(12) United States Patent
Laurent et al.

(10) Patent No.: US 12,551,892 B2
(45) Date of Patent: Feb. 17, 2026

(54) BIOPROCESSING DEVICE

(71) Applicant: ASTRAVEUS, Paris (FR)

(72) Inventors: Jérémie Laurent, Villeurbanne (FR); Giulia Ghinatti, Rovigo (IT); Philippe Kergourlay, Paris (FR)

(73) Assignee: ASTRAVEUS, Paris (FR)

( * ) Notice: Subject to any disclaimer, the term of this patent is extended or adjusted under 35 U.S.C. 154(b) by 833 days.

(21) Appl. No.: 17/783,092

(22) PCT Filed: Dec. 18, 2020

(86) PCT No.: PCT/EP2020/087067
§ 371 (c)(1),
(2) Date: Jun. 7, 2022

(87) PCT Pub. No.: WO2021/123200
PCT Pub. Date: Jun. 24, 2021

(65) Prior Publication Data

US 2023/0016447 A1 Jan. 19, 2023

(30) Foreign Application Priority Data

Dec. 20, 2019 (EP) .................................... 19306732

(51) Int. Cl.
*B01L 3/00* (2006.01)

(52) U.S. Cl.
CPC . *B01L 3/502761* (2013.01); *B01L 2200/0652* (2013.01); *B01L 2200/16* (2013.01); *B01L 2300/0861* (2013.01)

(58) Field of Classification Search
CPC ....... B01L 3/502761; B01L 2200/0652; B01L 2200/16; B01L 2300/0861; C12M 23/40; C12M 23/44; C12M 23/16
See application file for complete search history.

(56) References Cited

U.S. PATENT DOCUMENTS

| | | | | | |
|---|---|---|---|---|---|
| 4,033,825 | A * | 7/1977 | Haddad | C12M 23/40 435/297.1 |
| 5,155,034 | A * | 10/1992 | Wolf | C12N 5/0062 435/402 |
| 8,257,964 | B2 | 9/2012 | Hung et al. | |
| 9,134,207 | B2 | 9/2015 | Zhou et al. | |
| 10,012,640 | B2 | 7/2018 | Pant et al. | |

(Continued)

FOREIGN PATENT DOCUMENTS

WO 2016064757 A1 4/2016

OTHER PUBLICATIONS

International Search Report and Written Opinion issued on Apr. 13, 2021 in corresponding International Patent Application No. PCT/EP2020/087067; 11 pages.

*Primary Examiner* — Brian J. Sines
(74) *Attorney, Agent, or Firm* — Maier & Maier, PLLC

(57) ABSTRACT

A system for processing biological particles including bioprocessing microfluidic devices, reservoirs, buffer tanks and two fluidic connection systems. A first fluidic connection system includes valves and connecting elements between valves, so that each reservoir or port configured to connect a reservoir may be in fluidic connection with each buffer tank, and a second fluidic connection system includes valves and connecting elements between valves, so that each bioprocessing microfluidic device may be in fluidic connection with each buffer tank.

16 Claims, 3 Drawing Sheets

(56) References Cited

U.S. PATENT DOCUMENTS

| | | | | |
|---|---|---|---|---|
| 12,195,711 | B1 * | 1/2025 | Schutte | C12M 27/10 |
| 2003/0040104 | A1 | 2/2003 | Barbera-Guillem | |
| 2016/0340632 | A1 | 11/2016 | Breinlinger et al. | |
| 2018/0066221 | A1 * | 3/2018 | Kitahara | C12M 41/24 |

* cited by examiner

BIOPROCESSING DEVICE

FIELD

The present invention relates to a device and a method for processing biological objects, in particular biological cells.

BACKGROUND

Processing of biological objects is of key relevance in current biotechnology development. Complex series of operations such as amplification, concentration, purification, gene editing, gene delivery, RNA delivery, protein delivery, differentiation, dedifferentiation, harvest, sorting of cells, and harvest and purification are usual, leading to compounds that can be used directly for diagnostic or therapeutic purposes or as raw materials for other bioprocesses.

In order to work with minimal quantities of material in these bioprocesses and to allow for high-throughput, microfluidic devices or chips are often used. During bioprocesses, microfluidic devices need to be fed with various reactants or nutrients; cells have to be transported, stored, harvested . . . . These operations require fluidic connections, which may become very complex with increasing number of microfluidic devices and bioprocess variants.

U.S. Pat. No. 8,257,964 discloses a microwell cell-culture device, comprising wells connected to port stations via a multiplexing system. Port stations are intermediary items to supply cells or cell-culture media into each well. The multiplexing system allows controlled connection between each port station and each well, separately.

Besides, bioprocesses are developed as production methods for the 3rd and 4th generation of drugs, the latter being including advanced therapy medicinal products (ATMP). Often, a bioprocess is optimized in a microfluidic system by screening. Indeed, as a result of living cell complexity itself, screening is a more viable mean of optimizing processes than model based deterministic approaches alone.

Then, scaling-up from a screening batch size to an industrial manufacturing batch size is especially complex. In particular, transferring a protocol identified as optimal at screening stage to an industrial batch size is associated with several difficulties: (a) lack of accuracy in the bioprocess execution during screening may result in false positive or unreproducible results, (b) scaling the batch size up is typically not possible while maintaining values of parameters of a protocol identical. Finally, high performances of small-scale processes identified in screening are typically not reproducible at larger scale and so paradoxically performance (e.g. yield, efficiency, product quality . . . ) can decrease in bioprocesses when batch size increases.

It is the aim of the invention to propose a bioprocessing device in which numerous microfluidic devices may be operated simultaneously with the specific conditions identified in screening, so as to produce quantitative amounts of compounds of interest, with smart fluidic connection architectures. The same bioprocessing device can be used alternatively in screening, taking advantage of versatility offered by the smart fluidic connection architecture to run different conditions on numerous microfluidic devices.

SUMMARY

This disclosure thus relates to a system for processing biological particles comprising:

i. at least four bioprocessing microfluidic devices;

ii. at least three reservoirs or ports configured to connect a reservoir;

iii. at least one buffer tank; and iv. at least two fluidic connection systems.

In addition, the first fluidic connection system comprises valves and connecting means between valves, so that each reservoir or port configured to connect a reservoir may be in fluidic connection with each buffer tank; and the second fluidic connection system comprises valves and connecting means between valves, so that each bioprocessing microfluidic device may be in fluidic connection with each buffer tank.

Within this disclosure, the system uses reservoirs to stock reactants, biological particles in suspension, or nutrients for instance. Reservoirs may be included per se in the system, or reservoir may be outside the system but connected to the system through a port.

Within the disclosure, reservoirs may be connected and disconnected via connection ports on flow lines. In such cases connection ports are preferably of types protecting flow lines from contaminations from their environment, such as septa or swabbable valves. Reservoirs may also be substituted, for example by pipes or delocalized reactant sources or product outputs. Within the disclosure, a flow line is a sequence of connecting means, valves, ports, tips, inlets or outlets that define one or several fluidic connection(s) between components of the system.

Actually, the system needs to be configured to use at least three reservoirs: this configuration may be achieved with reservoirs or ports configured to connect a reservoir, or a combination thereof. In the disclosure, the term "reservoir" encompasses both reservoirs and ports configured to connect a reservoir.

This system is particularly suitable to process biological cells, for instance white blood cells, T cells, NK cells, hematopoietic stem cells (HSC), totipotent stem cells, pluripotent stem cells, multipotent stem cells, non-adherent cell lines, adherent cell lines.

Various bioprocesses may be implemented alone or combined with this system, for instance amplification, concentration, purification, gene editing, gene delivery, RNA delivery, protein delivery, differentiation, dedifferentiation, harvest, sorting of cells, and harvest and purification.

The first and second fluidic connection systems allow for improved versatility in bioprocess management. Indeed, all reactants may be distributed in each microfluidic device in a controlled manner, with reduced size and dead portions of connecting means and distributing means. Within this disclosure, a dead portion relates to a volume of connecting means that has to be filled or flushed with a liquid during flow in or from a component, i.e. microfluidic device, buffer tank or reservoir, said liquid being staying outside components and being lost in translation.

Within this disclosure, a valve is a mean to block or allow a fluid flow. Without limitation, valves may be: septa, swabbable valves (for example as disclosed in U.S. Pat. No. 6,651,956), pinch valves such as pinch valves based on elastomeric tube pinching, pinch valves based on microfluidic channel closure by membrane deformation (for example as disclosed in U.S. Pat. No. 6,929,030), other type of membrane based valves, phase transition valves such as valves operating by freezing the liquid content of a tube, mechanical valves (e.g. quarter turn stopcock, ball valves), surface tension based valves (e.g. in low pressure applications simply disconnecting two parts constituting the flow path to create an energy barrier due to air-liquid surface energy). Valves exhibiting stable closed state such as normally closed valves or bistable valves are preferable to reduce failure risks and undesired flows. Valves compatible with single use fluidic elements (e.g. parts in contact with reactant flows) are generally preferred as having entirely single use fluidic elements is found to reduce cross contamination risks between successive batches made with bioproduction instruments as well as reducing costs. Miniature valves and valves which can be integrated into microfluidic devices are advantageous in that they reduce dead portions volumes and allow higher density of microfluidic devices and as such higher throughputs. Valves are also defining limits between components of the whole system. In particular, microfluidic devices, reservoirs and buffer tank comprise inlets and/or outlets for fluids. These inlets and/or outlets end with a valve. Connecting means are designed between valves to define liquid distribution from one component to another.

In an embodiment, bioprocessing microfluidic devices comprise at least one chamber, in which biological particles may be stored and manipulated; at least one inlet to fill in the chamber and at least one outlet to drain out the chamber. Thanks to the inlet and outlet, a flow may be imposed in the microfluidic chamber without changing its volume. In addition, inlet and outlet may be in fluidic connection with other components of the system through specific connecting means. For instance, all reactants may be filled in the microfluidic device through inlet connected to a first flow line, while all products may be drained out the microfluidic device through outlet connected to a second flow line different from the first flow line: reactants and products will not be mixed in any connecting means.

In an embodiment, the chamber receiving microfluidic devices may sustain sterilization, for example by autoclaving, gamma rays or H2O2 vapor.

Microfluidic devices comprise at least one port, usually at least two ports. These ports are configured to establish fluidic connection between microfluidic devices and second fluidic connection system. Increasing the number of ports allows to manage complex bioprocesses but increases the complexity of connections in the system.

In a particular embodiment, one inlet and one outlet, i.e. two ports, are configured to define a seeding flow. Within the disclosure, a seeding flow is a flow that traps biological particles from the liquid flown into a microfluidic device into a chamber of the microfluidic device, the liquid flowing out of the microfluidic device during a seeding flow being depleted of biological particles flown into the device. In one of these embodiments trapping of biological particles relies on sedimentation and biological particles settle. Various other means may also be used to promote biological particles trapping in microfluidic devices such as flow traps (e.g. apertures in the flow smaller than biological particles, microwells) or coatings (e.g. extracellular matrix coating, antibody coating, cell adhesive polymer coatings etc.).

In another particular embodiment, one inlet and one outlet, i.e. two ports, are configured to define a harvest flow. Within the disclosure, a harvest flow is a flow intended to flush liquid medium of a microfluidic device, so that content of the microfluidic device is drained out to be recovered or harvested. The harvest flow may be gentle enough so that biological particles sitting in the microfluidic device are not displaced: liquid drained out may contain product of interest, which is eventually harvested. The harvest flow may be stronger so that biological particles are displaced and harvested. Main parameters governing the strength of the harvest flow are the geometry of the microfluidic device, liquid viscosity and flow rate. Ancillary means may be applied to favor harvest of the product of interest and/or biological particles such as vibrations or ultrasounds, chemical and/or enzymatic treatments, for example.

In a particular embodiment, inlet and outlet configured to define a seeding flow are the same as inlet and outlet configured to define a harvest flow. In this embodiment one geometry of inlet and outlet is used with different flow conditions, e.g. flow rate, to realize seeding or harvesting.

Both preceding embodiments may be combined on a single microfluidic device, as disclosed in European patent applications EP18305786 or EP19306568, yielding microfluidic devices with several chambers and fluidic channels allowing for seeding and harvesting these chambers.

In an embodiment, the buffer tank is controlled by a pressure source. Said pressure source may produce a high pressure leading to drain the buffer tank out, partially or totally. Said pressure source may produce a low pressure leading to fill in the buffer tank, partially or totally. Thanks to the pressure source and the first and second fluidic connection systems, flows between components of the system may be all controlled with the pressure source.

In a particular embodiment, the buffer tank comprises at least one chamber, for instance in the form of a helicoidal tube or a coil; a pressure source and means for controlling the volume of liquid in the chamber. Thanks to this configuration, volume in the buffer tank is monitored continuously giving access to the volume flown in a microfluidic device or a reservoir or flown out a microfluidic device or a reservoir. A single pressure source and volume monitoring enables to control all volume exchanges in the system. In this embodiment, the chamber may have an average cross-section comprised between 0.1 $mm^2$ and 9 $mm^2$, which is a good compromise between storage volume and hydraulic resistance of the buffer tank.

In a particular embodiment, the system for processing biological comprises at least two buffer tanks, in particular, two, three, four or five buffer tanks.

In another embodiment, the system for processing biological particles comprises at least two buffer tanks, the liquid volumes being monitored in at least one of them. With such a configuration, it is possible to flow a volume of a first liquid from a first buffer tank towards a microfluidic device through the second fluidic connection system. Then a second liquid from a second buffer tank is flown towards the same microfluidic device so as to fill the dead portion of the second fluidic connection system, allowing to have all volume of first liquid filled in the microfluidic device. This is advantageous for reactants or biological particles available in low quantity and to avoid wasting precious biologic material into connecting means or inactive components of the system. Alternatively, with such a configuration, it is possible to flow a liquid from a first buffer tank so as to harvest to content of a microfluidic device, this content being transferred simultaneously in a second buffer tank as the volume of the microfluidic device remains essentially constant.

In an embodiment buffer tanks may be equipped with a biological particle detector allowing to monitor the number of biological particles displaced, in particular during seeding of microfluidic devices. Indeed, the number of biological particles seeded for a bioprocess is one of the most impactful and difficultly controlled parameters. Controlling this number allows to determine yield of a bioprocess per particle for instance, which is critical in screening to select to most promising process.

Suitable buffer tanks are described in European patent application EP18306872.

In an embodiment, the system for processing biological particles further comprises a waste tank, so that each reservoir, each buffer tank and each bioprocessing microfluidic device may be in fluidic connection with waste tank through the first fluidic connection system and/or through the second fluidic connection system.

In an embodiment, connection systems may be isolated by specific means such as one-way check valves from the waste container. In such embodiment, the connection system connected to the waste tank may in part be reused and be equipped with analytical means such as chemical analysis modules, particle suspension analysis modules or any type of analysis module. Indeed flow to the waste container is very frequent over bioprocesses durations, such embodiments thus allow for regular analysis of bioprocesses output fluids providing extensive information which may be part of the quality control process and be leveraged to optimize bioprocesses, for example if some reactants are above or below certain thresholds corrective measures may be programmed. The isolation of such analytical modules allows using reusable analytical cells, such as spectroscopy cells, leading to cost reduction.

In an embodiment, connecting means comprise tubes, or functionally equivalent elements comprising channels for liquid flow. Suitable tubes may have an inner diameter less than 3 mm, and depending on microfluidic devices sizes and configuration, inner diameters less than 1.6 mm and greater than 0.1 mm are preferred. This range of inner diameter is a good compromise between inner volume and hydraulic resistance of the connecting means. Tubes of large inner diameter are preferably used for long connections (in the order of the meter) and tubes of reduced inner diameter are preferred when they are specific to the connection of a reduced number of reservoirs or microfluidic devices. Various types of tubing materials may be used, medical grade materials and relatively inert materials are generally preferred. Silicone, and in particular platinum cured or otherwise USP class VI compliant silicone is a suitable choice although its permeability to gases should be taken into account and notably associated evaporation through the tubing wall. PTFE, or other fluorinated polymers exhibit good performances, notably to reduce biological particle adhesion in connecting means. Tubing resistance to pressure should be verified as microfluidic device may need relatively high perfusing pressures. In the event that a material such as PTFE is chosen, which is incompatible with pinched tube valves, pinched tubes valves may still be used by using a small portion of deformable tubing such as platinum cured silicone specifically for the segment associated to the valve. Such a portion being minimized large inner diameter with respect to considerations above may be used for this portion, in particular this portion inner diameter may be greater than the other type of tubing. This embodiment defines a fixed topology of connecting means between valves which does not require a complex addressing system in the first and second fluidic connections systems. This embodiment also reduces risks of contamination of fluids handled in connecting means by agents such as airborne particles which may be present in the connecting means surrounding.

In an embodiment, valves are tips configured to open fluidic connection when two tips are in contact and configured to close fluidic connection when a tip is not in contact with another tip. Suitable tips are, for example, the combination on one side of a swabbable valve with a connector compatible with the swabbable valve on the other side. The connector is coupled to an electronically controlled pinch valve or phase transition valve—i.e. a mean to block the flow as close as possible to the distal end of the connector. In this example the electronically controlled pinch valve or phase transition valve is more complex and expansive to integrate, hence the arrangement of swabbable valves and connectors should minimize the number of connectors and maximize that of swabbable valves. For instance, swabbable valves would be tips associated directly to microfluidic devices and connectors coupled to an electronically controlled valves would be tips associated directly to buffer tanks. This embodiment is particularly advantageous because connecting means topology is dynamically established, allowing for elimination of fixed connecting means, such as tubes, thus reducing volume of connecting means, hence reducing dead portions and/or volume occupied by connecting means in the system.

In embodiments with dynamic topology, any type of mechanical actuation of microfluidic devices relative to the buffer tanks may be used alone or in combination. Combinations allowing to arrange microfluidic devices 1D, 2D, or 3D arrays are advantageous for high density integration.

The system for processing biological particles may use in one part a fixed topology and in another part a dynamic topology.

In an embodiment, the inner volume of the second connection system is less than 300% of volume of all bioprocessing microfluidic devices. Such volume is desirable to avoid precious reactants or biologic particles staying in connecting means instead of going into active components of the system, i.e. microfluidic devices. Within this disclosure, the inner volume of an element is the volume of liquid that may be contained in this element. The inner volume of the second connection system is the sum of volumes of each connecting mean comprised in the connection system.

In an embodiment, the number of valves of the first fluidic connection system is less than the number of reservoirs multiplied by three times the number of buffer tanks, preferably multiplied by two times the number of buffer tanks, more preferably multiplied by the number of buffer tanks.

In an embodiment, the number of valves of the second fluidic connection system is less than the number of ports of all bioprocessing microfluidic devices multiplied by the number of buffer tanks. In a specific embodiment, the number of valves of the second fluidic connection system is less than the number of bioprocessing microfluidic devices multiplied by the number of buffer tanks.

In a usual multiplexing system, each reservoir is connected to each microfluidic device through a connecting mean controlled by a valve. Thus, the number of valves required is the number of microfluidic devices multiplied by the number of reservoirs. 60 valves would be required for 6 microfluidic devices and 10 reservoirs. Actually, because they are multiple ports on each microfluidic device a usual multiplexing system allows to connect individually each port of each microfluidic device to any reservoir. The number of valves required is then the number of ports of each microfluidic devices multiplied by the number of reservoirs. Typically, microfluidic devices have at least two ports, and often four ports.

Introduction of buffer tanks permits to lower the number of valves, because one needs only to establish connections between all microfluidic devices and a small number of buffer tanks and between all reservoirs and a small number of buffer tanks.

In both previous embodiments, reducing the number of valves is desirable since it correspond to a decrease in complexity, i.e. number of elements of the system, and a decrease in overall volume of connecting means between valves.

In an embodiment, the number of valves of the first and second fluidic connection systems is less than the number of ports of all bioprocessing microfluidic devices multiplied by the number of reservoirs. In a specific embodiment, the number of valves of the first and second fluidic connection systems is less than the number of bioprocessing microfluidic devices multiplied by the number of reservoirs.

In an embodiment, some components of the system for processing biological particles are enclosed in a pressurized chamber, in particular microfluidic devices and optionally buffer tanks and second fluidic connection system. In this embodiment a pneumatic clamping force is applied on each microfluidic device present in the system, i.e. resulting from the pressure difference between the pressure of the clamping fluid in the system and the pressure of the fluids (imposed by pumps and flows) in the microfluidic device. In the case of a microfluidic device comprising an elastomeric back plate and/or an elastomeric cover plate, the clamping pressure is also advantageous in that it may reduce the pressure difference between the inside and the outside of the microfluidic device when in use, thus reducing the deformation of the elastomeric material and limiting variations in the geometry of the microfluidic device. Additionally, such a pressure difference ensures that, in case of leaks in a microfluidic device, no flow can come out of the microfluidic device, which is advantageous in particular when the fluid contains hazardous or precious materials. Last, pneumatic clamping is a great advantage over mechanical clamping systems such as rigid plates with bolts, C-clamp, magnets or shafts and levers, which limit or hinder access to the periphery of the microfluidic device. On the contrary, with pneumatic clamping, access to the microfluidic device is provided on the whole periphery thereof, increasing possibilities to establish fluidic connections or to optically monitor microfluidic device contents.

Suitable pressurized chamber is described in European patent applications EP19306048.

This disclosure also relates to a method for processing biological particles using a system as described above, the method comprising:

i. flowing liquid containing biological particles from at least one reservoir into at least one buffer tank through the first fluidic connection system; and
ii. flowing liquid containing biological particles from at least one buffer tank into at least one bioprocessing microfluidic device through the second fluidic connection system.

This method is particularly suitable to process biological cells, for instance white blood cells, T cells, NK cells, hematopoietic stem cells (HSC), totipotent stem cells, pluripotent stem cells, multipotent stem cells, non-adherent cell lines, adherent cell lines.

BRIEF DESCRIPTION OF THE DRAWINGS

Features and advantages of the invention will become apparent from the following description of embodiments of a system and a method according to the disclosure, this description being given merely by way of example and with reference to the appended drawings in which.

DETAILED DESCRIPTION

Figure 1:
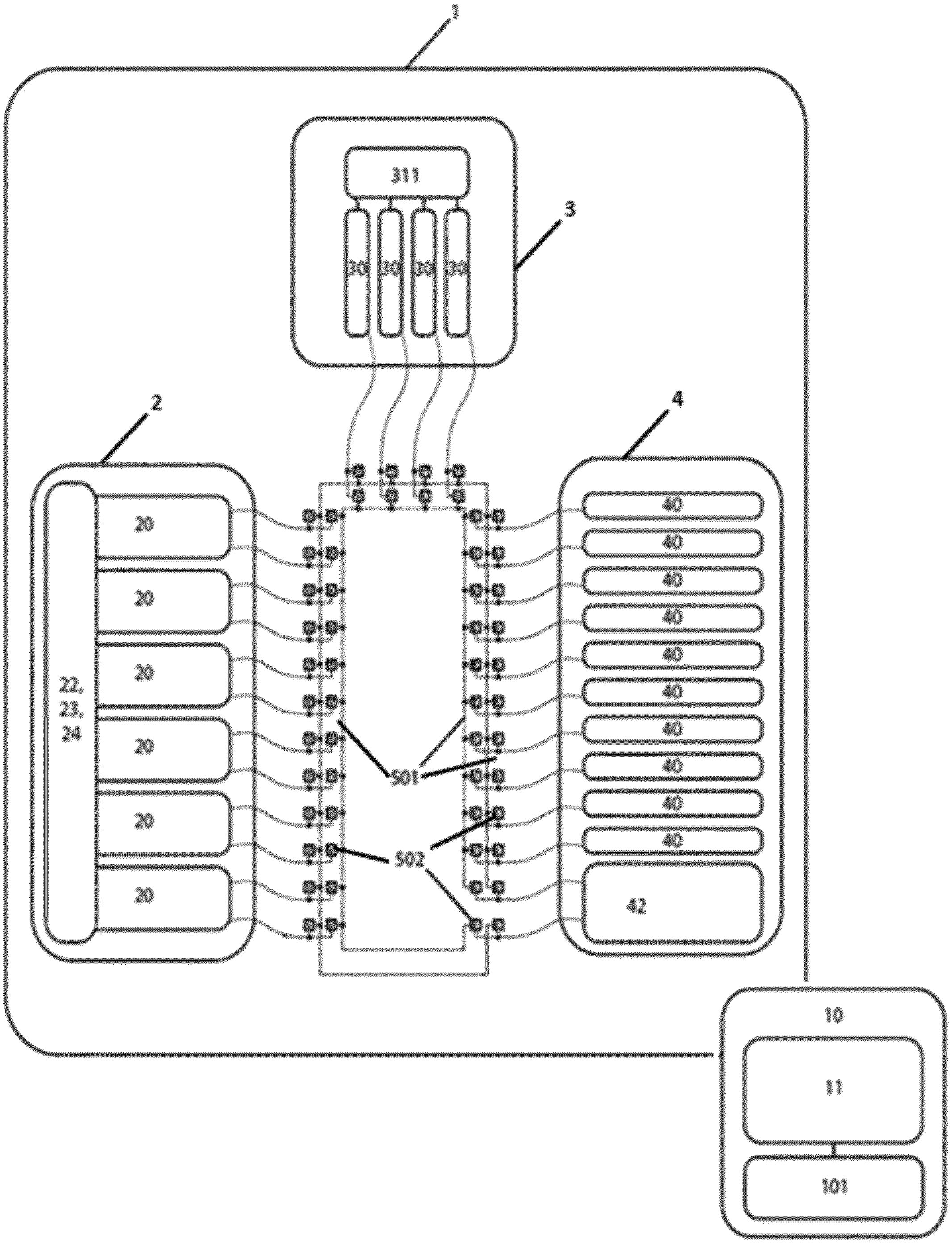
FIG. 1 is a schematic architecture of a system for processing biological particles in a fixed topology configuration of connecting means.

FIG. 1 shows a system (1) according to a first embodiment of the disclosure, intended to process biological particles. Six microfluidic devices (20) are placed in a chamber (2) of the system (1). Each microfluidic device comprises an inlet and an outlet (i.e. two ports), both ending with a valve (502). Ten reservoirs (40) are placed in the system (1) and comprise an outlet ending with a valve (502). Here, reservoirs (40) are refrigerated in a refrigerated chamber (4). Four buffer tanks (30) are placed in the system (1) and comprise an inlet/outlet ending with a valve (502). Here, buffer tanks (30) are temperature controlled in a chamber (3), typically at the temperature biological cells are processed. Between valves (502) are arranged connecting means (501) in the form of tubes. By proper configuration of open and closed valves, each reservoir can be in fluidic connection with each buffer tank and each buffer tank can be in fluidic connection with each microfluidic device.

In the present application, a buffer tank is a fluidic element in which liquid is introduced, temporarily stored, then drained out. Buffer tanks may be chambers or elongated tubes for instance.

Here, the first fluidic connection system comprises valves (502) associated to reservoirs (40) and buffers tanks (30) and connecting means (501) between these valves (502). 28 valves (502) are used to connect 10 reservoirs (40) with 4 buffer tanks (30). The second fluidic connection system comprises valves (502) associated to microfluidic devices (20) and buffers tanks (30) and connecting means (501) between these valves (502). Valves (502) associated with buffer tanks (30) are part of both the first and the second fluidic connection systems.

Microfluidic devices (20) are further linked to control modules (22, 23) for temperature and dissolved gas concentration in chamber (2). Water content of microfluidic devices is further controlled by a module (24) to measure water loss and eventually add or remove water in microfluidic devices if required. When water loss is caused by evaporation, water vapor is added in the chamber comprising the microfluidic devices (20).

As illustrated in a non-limitative way, system (1) comprises a waste tank (42), which may be in fluidic connection with each reservoir (40), each buffer tank (30) and each microfluidic device (20). In the illustrated embodiment, the set of connecting means (501) located closest to reservoirs (40), buffer tanks (30) and microfluidic devices (20) (via inlet) is used to flow content of reservoirs (40) into microfluidic devices (20) through temporary storage in buffer tanks (30), defining a first flow line. The set of connecting means (501) located farthest of reservoirs (40), buffer tanks (30) and microfluidic devices (20) (via outlet) is used to flow liquids into the waste (42), defining a second flow line. With such configuration, liquid disposal to the waste (42) does not use the same connecting means (501) as liquid delivery to the microfluidic channels (20).

Besides, in the illustrated embodiment the connection systems comprise two independent flow lines connecting microfluidic devices (20) to buffer tanks (30) or to the waste tank (42). With such a configuration, it is possible to flow a liquid from a first buffer tank (30) so as to harvest the content of a microfluidic device (20), this content being transferred simultaneously in a second buffer tank (30) as the volume of the microfluidic device remains essentially constant. Having at least two buffer tanks (30) which may be connected via different flow lines to a single microfluidic device (20) allows recollecting liquids from a microfluidic device, in particular when it comprises a product or biological particles of interest, for their transfer to an outer container connected via a port or into a reservoir (40).

In the example shown in FIG. 1, buffer tanks (30) are controlled by a pressure source (311), here a pressure controller. By depression of the pressure source (311), liquid flow is induced from reservoir (40) or microfluidic device (20) into a buffer tank (30). With increased pressure of the pressure source (311), liquid flow is induced from buffer tank (30) to microfluidic device (20), reservoir (40) or waste (42). To avoid formation of bubbles induced by low pressure, it is preferred to use an increased pressure of the pressure source. In the specific case of a flow imposed from a first buffer tank (30) to a microfluidic device (20) to harvest the content of said microfluidic device (20) into a second buffer tank (30), the first buffer tank (30) is pressurized and the second buffer tank (30) is kept at a pressure high enough to avoid bubble formation.

According to this embodiment of the system (1), a controller (10) with a user interface (11) and a central computer (101) enables setting flows in the system according to the bioprocess considered. The controller monitors parameters: temperature, pressure, humidity, gas concentration in microfluidic devices, water loss of microfluidic devices, time and duration of process steps and defines flows between all components of the system in terms of flow rates and displaced volumes.

In a variant, the system (1) may be organized with a plurality of chambers (2), each chamber (2) comprising at least four bioprocessing microfluidic devices; with a plurality of chambers (4), each chamber (4) comprising at least three reservoirs (40) or ports configured to connect a reservoir; and a plurality of chambers (3), each chamber (3) comprising at least one buffer tank (30).

This variant is typically obtained by addition of a fluidic connection between two sub-systems, each sub-system being illustrated in FIG. 1. For instance, one reservoir (40) may be substituted by the fluidic connection between both sub-systems.

With this variant, versatility of the system is increased. Bioprocessing microfluidic devices may be stored at different temperatures, while using the same reservoirs. Several reservoir chambers may be also controlled at different temperatures, depending on the chemicals stored. Several buffers may be used for specific steps of liquid flow, avoiding cross contamination. Last but not least, this parallelization variant allows to increase on demand the number of bioprocessing microfluidic devices used in similar conditions.

Figure 2:
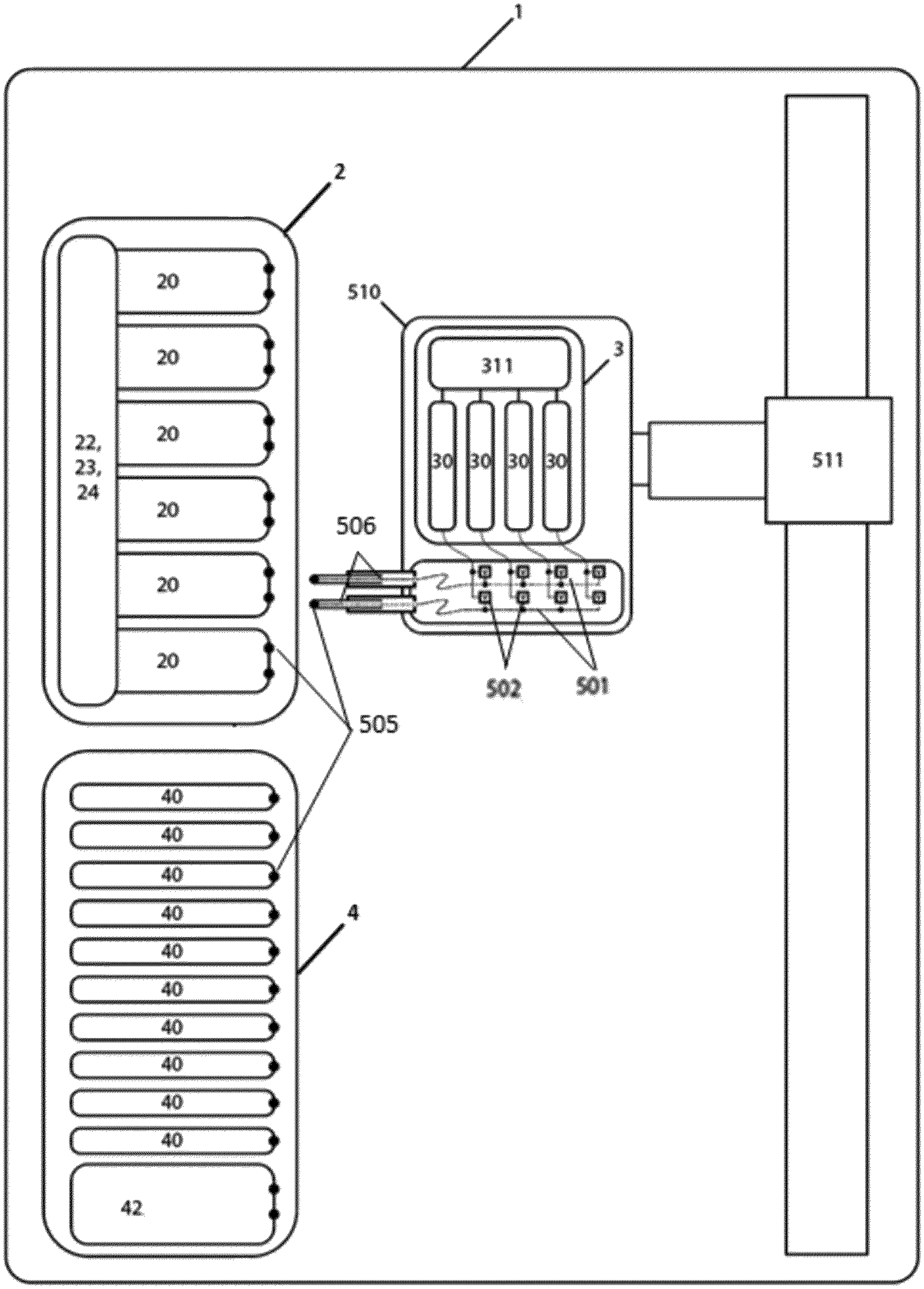
FIG. 2 is a schematic architecture of a system for processing biological particles with a part of connecting means in a fixed topology and another part of connecting means in a dynamic topology.

FIG. 2 shows a system (1) according to a second embodiment of the disclosure, intended to process biological particles. Elements similar to those of the first embodiment bear identical references. Six microfluidic devices (20) are placed in a chamber (2) of the system (1). Each microfluidic device comprises two ports: an inlet tip (505) and an outlet tip (505) acting as valves. Ten reservoirs (40) are placed in the system (1) and comprise a tip (505) acting as a valve. Here, reservoirs (40) are refrigerated in a refrigerated chamber (4). Four buffer tanks (30) are placed in the system (1) and comprise an inlet/outlet ending with a valve (502). Here, buffer tanks (30) are temperature controlled in a chamber (3), typically at the temperature biological cells are processed. Between valves (502) are arranged connecting means (501) in the form of tubes. Two tips (505) acting as valves are arranged on tubes inside two injectors (506). The first fluidic connection system comprises valves (502), injectors (506) and tips (505) associated with buffer tanks (30) and tips (505) associated with reservoirs and connecting means (501) between these valves/tips. The second fluidic connection system comprises valves (502), injectors (506) and tips (505) associated with buffer tanks (30) and tips (505) associated with microfluidic devices (20) and connecting means (501) between these valves/tips.

As illustrated in a non-limitative way, buffer tanks (30) and pressure source (311) are placed on a moving head (510), whose displacement is controlled by an arm (511). By proper move of the moving head (510), the tip (505) of one injector (506) is brought in contact with a tip (505) of a reservoir (40), thus opening a fluidic connection of the first fluidic connection system. Then, after another move of the moving head (510), the tip (505) of one injector (506) is brought in contact with a tip (505) of a microfluidic device (20), thus opening a fluidic connection of the second fluidic connection system.

In the example shown in FIG. 2, two fluidic connections are realized simultaneously between a microfluidic device (20) and the two injectors (506). One fluidic connection is used to flow liquid from a first buffer tank (30) to microfluidic device (20) and the second fluidic connection is used to flow liquid from microfluidic device (20) to a second buffer tank (30), thus keeping the volume of microfluidic device (20) constant. Liquid removed from microfluidic device (20) is stored in buffer tank (30) and may be discarded to waste (42) or used further in bioprocesses in another microfluidic device (20) or stored in a reservoir (40) as a final product.

In this embodiment, the volume of connecting means (501) is very strongly limited, as the topology of connecting means (501) is dynamically adapted on demand with displacement of moving head (510). In particular the inner volume of the second connection system is not dependent of the number of microfluidic devices (20) nor of the distance between them. Thus, volumes transferred from a buffer tank (30) to a microfluidic device is almost totally transferred without liquid remaining in dead portions. In addition, only 20 valves/tips are used to connect 10 reservoirs with 4 buffer tanks. And 22 valves/tips are used to connect 6 microfluidic devices with two ports each with 4 buffer tanks. A total of 32 valves/tips is sufficient to connect 10 reservoirs and 6 microfluidic devices with a great versatility of flows and processes.

In this embodiment, the chamber (2) is pressurized so that pressure in the chamber (2) is higher than pressure in microfluidic devices (20). This overpressure avoids any risk of leak through the tips (505). When two tips (505) are in contact, the high pressure or low pressure generated by the pressure source (311) is sufficient to flow liquid through the tips (505).

Figure 3:
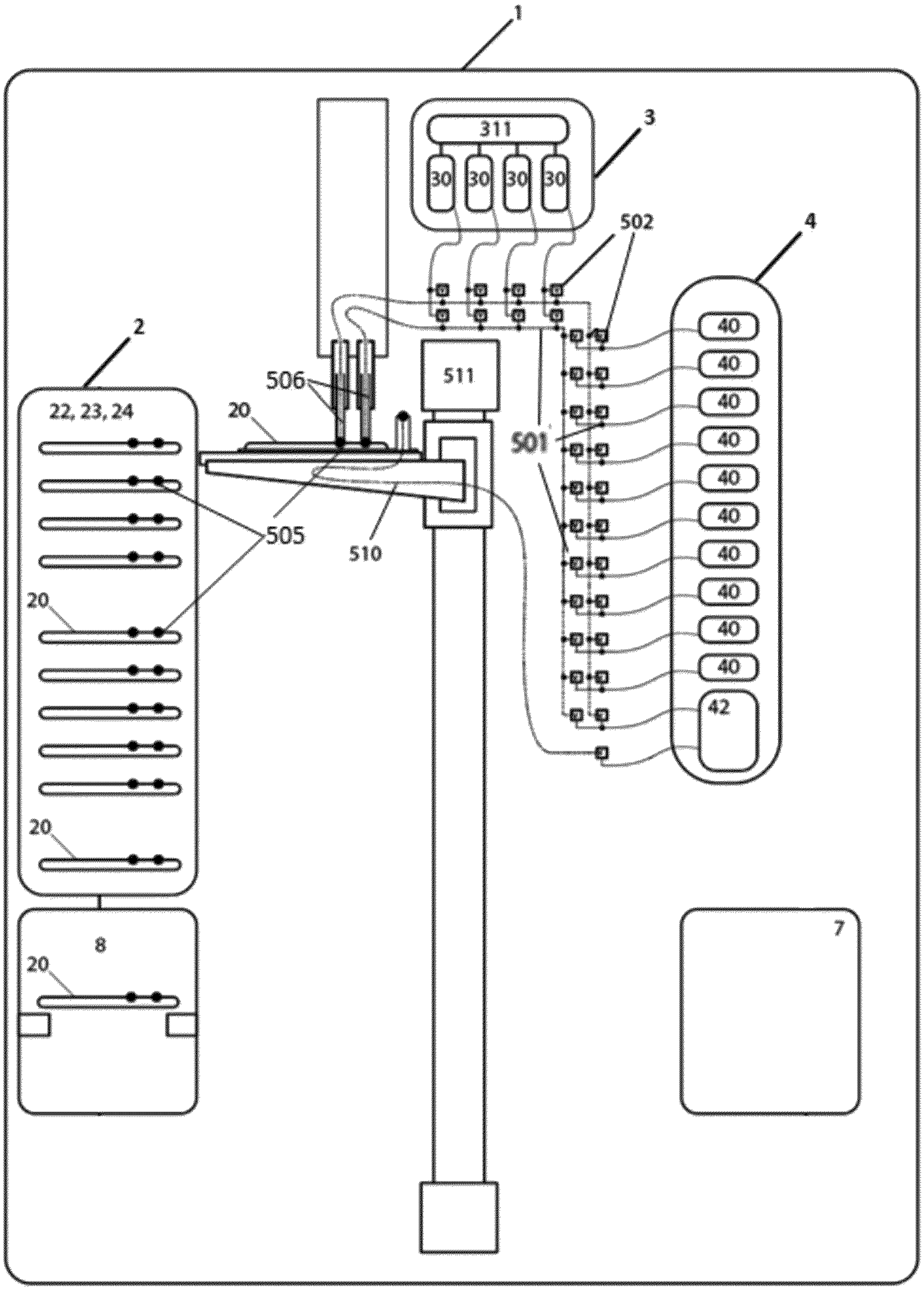
FIG. 3 is a schematic architecture of a system for processing biological particles in which dynamic topology of connecting means is achieved by moving microfluidic devices.

FIG. 3 shows a system (1) according to a third embodiment of the disclosure, intended to process biological particles. Elements similar to those of the first and second embodiments bear identical references. twelve microfluidic devices (20) are placed in a chamber (2) of the system (1). Each microfluidic device comprises two ports: an inlet tip (505) and an outlet tip (505) acting as valves. Ten reservoirs (40) are placed in the system (1) and comprise an outlet ending with a valve (502). Here, reservoirs (40) are refrigerated in a refrigerated chamber (4). Four buffer tanks (30) are placed in the system (1) and comprise an inlet/outlet ending with a valve (502). Here, buffer tanks (30) are temperature controlled in a chamber (3), typically at the temperature biological cells are processed. Between valves (502) are arranged connecting means (501) in the form of tubes. Two tips (505) acting as valves are arranged on tubes inside two injectors (506) which are fixed. The first fluidic connection system comprises valves (502) associated with buffer tanks (30) and reservoirs, injectors (506) and tips (505) and connecting means (501) between these valves/tips. The second fluidic connection system comprises valves (502), injectors (506) and tips (505) associated with buffer tanks (30) and tips (505) associated with microfluidic devices (20) and connecting means (501) between these valves/tips.

As illustrated in a non-limitative way, a moving head (510), whose displacement is controlled by an arm (511), can hold and move a microfluidic device (20) in different locations in the chamber (1). By proper move of the moving head (510), the tips (505) of both injectors (506) are brought in contact with two tips (505) of the microfluidic device (20), thus opening a fluidic connection of the second fluidic connection system, similarly as in the second embodiment. Injectors (506) may be mounted on mechanical actuators and/or be equipped with detectors such as contact or pressure sensors allowing to adjust the coupling with feedback. The topology of the second fluidic connection system is adapted dynamically on demand. On the other hand, the first fluidic connection system is similar to the first embodiment. This embodiment is particularly relevant when high numbers of microfluidic devices (20) are used, for example more than 100, while few reservoirs (40) are used in the system (1).

In the example shown in FIG. 3, an additional bioprocessing module (7) is arranged in the chamber. This additional module can be used for selective processes on one microfluidic device (20) moved by the moving head (510), such as washing, cell sorting (optically, magnetically or by size exclusion), electroporation, filtration, lysis, microinjection, purification, ion exchange or any usual bioprocessing step such as amplification, concentration, purification, gene editing, gene delivery, RNA delivery, protein delivery, differentiation, dedifferentiation, harvest, sorting of cells, and harvest and purification.

In the example shown in FIG. 3, an additional analysis module (8) is arranged in the system (1). A microfluidic device (20) may be moved in the analysis module (8) by the moving head (510), then the microfluidic device (20) itself or the liquid contained therein is analyzed by microscopy, spectroscopy, mass spectrometry, chemical analysis, rheology, Polymerase Chain Reaction (PCR), Reverse Transcription Polymerase Chain Reaction (RT-PCR), Elisa, gene sequencing, or any usual analysis protocol. Specifically, a microfluidic device (20) may be used as low volume reservoir for transfer to the analysis module (8) and then analysis. This microfluidic device (20) may be configured for specific analysis.

The invention claimed is:

1. A system for processing biological particles comprising:

i. at least four bioprocessing microfluidic devices;

ii. at least three reservoirs or ports configured to connect a reservoir;

iii. at least one buffer tank; and iv. at least two fluidic connection systems;

wherein a first fluidic connection system comprises valves and connecting means between valves, so that each reservoir or port configured to connect a reservoir may be in fluidic connection with each buffer tank; and wherein a second fluidic connection system comprises valves and connecting means between valves, so that each bioprocessing microfluidic device may be in fluidic connection with each buffer tank.

2. The system for processing biological particles according to claim 1, further comprising a waste tank, so that each reservoir, each buffer tank and each bioprocessing microfluidic device may be in fluidic connection with waste tank through the first fluidic connection system and/or through the second fluidic connection system.

3. The system for processing biological particles according to claim 1, wherein connecting means comprise tubes.

4. The system for processing biological particles according to claim 1, wherein valves are tips configured to open fluidic connection when two tips are in contact and configured to close fluidic connection when a tip is not in contact with another tip.

5. The system for processing biological particles according to claim 1, wherein the inner volume of the second connection system is less than 300% of volume of all bioprocessing microfluidic devices.

6. The system for processing biological particles according to claim 1, wherein the number of valves of the first fluidic connection system is less than the number of reservoirs multiplied by three times the number of buffer tanks.

7. The system for processing biological particles according to claim 1, wherein the number of valves of the second fluidic connection system is less than the number of ports of all bioprocessing microfluidic devices multiplied by the number of buffer tanks.

8. The system for processing biological particles according to claim 1, wherein the number of valves of the first and second fluidic connection systems is less than the number of ports of all bioprocessing microfluidic devices multiplied by the number of reservoirs.

9. The system for processing biological particles according to claim 1, wherein buffer tanks are controlled by a pressure source.

10. The system for processing biological particles according to claim 1, wherein system comprises at least two buffer tanks.

11. The system for processing biological particles according to claim 1, wherein the microfluidic devices are enclosed in a pressurized chamber.

12. The system for processing biological particles according to claim 1, wherein biological particles are biological cells.

13. The system for processing biological particles according to claim 1, wherein the first and second fluidic connection systems are independent from each other.

14. The system for processing biological particles according to claim 1, further comprising at least one waste tank, wherein the second fluidic connection system comprises valves and connecting means between valves, so that each bioprocessing microfluidic device may be put in fluidic connection with each buffer tank or the waste tank, and wherein the connection systems comprise two independent flow lines, a first flow line and a second flow line, the first flow line connecting the reservoirs to the microfluidic devices through the buffer tanks, and the second flow line connecting each microfluidic device and each buffer tank to the waste tank.

15. Method for processing biological particles using a system according to claim 1, the method comprising:

i. flowing liquid containing biological particles from at least one reservoir into at least one buffer tank through the first fluidic connection system; and ii. flowing liquid containing biological particles from at least one buffer tank into at least one bioprocessing microfluidic device through the second fluidic connection system.

16. The method for processing biological particles according to claim 15, wherein biological particles are biological cells.

* * * * *